(12) United States Patent
Strong

(10) Patent No.: US 11,724,272 B2
(45) Date of Patent: Aug. 15, 2023

(54) SYSTEMS AND METHODS FOR A MATERIAL SENSOR FOR A MATERIAL PUMP

(71) Applicant: Carlisle Fluid Technologies, Inc., Scottsdale, AZ (US)

(72) Inventor: Christopher Lee Strong, Frederick, CO (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 117 days.

(21) Appl. No.: 15/793,809

(22) Filed: Oct. 25, 2017

(65) Prior Publication Data

US 2018/0111146 A1   Apr. 26, 2018

Related U.S. Application Data

(60) Provisional application No. 62/413,403, filed on Oct. 26, 2016.

(51) Int. Cl.
*B05B 12/00* (2018.01)
*B05B 12/08* (2006.01)
(Continued)

(52) U.S. Cl.
CPC .......... *B05B 12/008* (2013.01); *B05B 9/0409* (2013.01); *B05B 12/006* (2013.01);
(Continued)

(58) Field of Classification Search
CPC . B05B 12/085; B05B 12/088; B05B 12/1418; B05B 12/1472; B05B 9/0409;
(Continued)

(56) References Cited

U.S. PATENT DOCUMENTS

| 3,010,320 A | 11/1961 | Sollecito |
| 3,275,011 A | 9/1966 | Berezansky et al. |

(Continued)

FOREIGN PATENT DOCUMENTS

| CN | 101726432 A | 6/2010 |
| CN | 104614023 A | 5/2015 |

(Continued)

OTHER PUBLICATIONS

"Benefits of Rotary Atomizer" Michael Hansinger, PE. Sep. 18-21, 1995 (Year: 1995).*

(Continued)

*Primary Examiner* — Alexander B Comley
(74) *Attorney, Agent, or Firm* — Fletcher Yoder, P.C.

(57) ABSTRACT

A system includes a material sensor system having an inlet and an outlet. The inlet receives a flow of a material and the outlet outputs the flow of the material. The material sensor system includes an inner cavity having a surface, where the inner cavity receives the flow of the material. The material sensor system also includes a float system having one or more floats, where the one or more floats float within the material of the inner cavity. The material sensor system also includes a switch that sends one or more signals to a control valve system when the float system engages the surface of the inner cavity.

20 Claims, 5 Drawing Sheets

(51) Int. Cl.
- *F04B 49/04* (2006.01)
- *B05B 9/04* (2006.01)
- *B05B 12/14* (2006.01)
- *B05B 7/24* (2006.01)
- *F04B 49/06* (2006.01)

(52) U.S. Cl.
CPC ............ *B05B 12/085* (2013.01); *F04B 49/04* (2013.01); *B05B 7/2489* (2013.01); *B05B 12/1418* (2013.01); *B05B 12/1472* (2013.01); *F04B 49/06* (2013.01)

(58) Field of Classification Search
CPC ... B05B 9/0413; B05B 9/0406; B05B 7/2489; B05B 1/202; B05B 16/25; B05B 9/04–043; B05B 12/006–008; B05B 12/081; B05B 12/087; F04B 49/04; F04B 2203/0201; F04B 49/025; F04B 49/06–065; G01F 23/74; G01F 23/00–76; B65D 83/005; F04D 9/045; F04D 9/046; F04D 15/0218

USPC ...................................................... 222/51, 67
See application file for complete search history.

(56) References Cited

U.S. PATENT DOCUMENTS

| | | | |
|---|---|---|---|
| 3,471,664 A | 10/1969 | Hansen | |
| 3,798,401 A * | 3/1974 | Kochanski | G01F 23/70 200/84 C |
| 4,298,019 A * | 11/1981 | Daransky | F01K 3/265 137/118.04 |
| 4,610,165 A | 9/1986 | Duffy et al. | |
| 4,809,909 A * | 3/1989 | Kukesh | B29B 7/905 239/336 |
| 5,167,041 A * | 12/1992 | Burkitt, III | G01F 23/74 4/541.2 |
| 5,217,160 A * | 6/1993 | Lopes | B05B 12/00 239/332 |
| 5,294,052 A * | 3/1994 | Kukesh | B29B 7/7626 239/416.1 |
| 5,347,664 A * | 9/1994 | Hamza | A61H 33/6073 4/292 |
| 5,570,839 A * | 11/1996 | Kukesh | B29B 7/7615 239/72 |
| 5,686,894 A * | 11/1997 | Vig | G01D 5/145 340/618 |
| 5,788,164 A * | 8/1998 | Tomita | B05B 3/1064 239/112 |
| 5,986,554 A * | 11/1999 | Furber | G01F 23/683 340/623 |
| 6,123,340 A * | 9/2000 | Sprafka | F16K 27/003 137/515.7 |
| 6,158,673 A | 12/2000 | Toetschinger et al. | |
| 6,203,183 B1 * | 3/2001 | Mordaunt | B05B 12/1418 366/182.4 |
| 6,294,605 B1 * | 9/2001 | Suzuki | C09D 7/69 427/407.3 |
| 6,326,895 B1 * | 12/2001 | Hartke | G01F 23/303 73/317 |
| 6,557,412 B1 * | 5/2003 | Barbier | G01F 23/76 340/623 |
| 6,612,543 B2 | 9/2003 | Strobel | |
| 6,892,573 B2 | 5/2005 | Gansebom | |
| 7,249,507 B2 | 7/2007 | Weedon | |
| 7,338,028 B2 | 3/2008 | Zimmerling et al. | |
| 7,587,897 B2 | 9/2009 | Strong | |
| 7,603,855 B2 | 10/2009 | Strong | |
| 8,291,761 B2 | 10/2012 | Burdi et al. | |
| 8,402,822 B2 | 3/2013 | Hopper | |
| 8,404,822 B2 | 3/2013 | Kuribayashi et al. | |
| 8,640,729 B2 | 2/2014 | Dana | |
| 8,650,949 B1 | 2/2014 | Ostlie et al. | |
| 9,003,878 B2 | 4/2015 | Mawhinney et al. | |
| 2002/0194674 A1 * | 12/2002 | McKenna | E03C 1/242 4/538 |
| 2004/0256584 A1 * | 12/2004 | Zimmerling | F16K 31/086 251/7 |
| 2005/0056092 A1 * | 3/2005 | Kowalski | G01F 23/74 73/313 |
| 2006/0014062 A1 * | 1/2006 | Wheat | G05D 9/12 429/515 |
| 2006/0222508 A1 * | 10/2006 | Cantolino | F24F 13/222 417/40 |
| 2007/0246565 A1 * | 10/2007 | Turnbull | G01F 23/24 239/74 |
| 2008/0168836 A1 * | 7/2008 | Wu | G01F 23/62 73/305 |
| 2009/0288483 A1 * | 11/2009 | Varga | G01F 23/303 73/292 |
| 2011/0138907 A1 * | 6/2011 | Rudd | G01F 23/74 73/313 |
| 2013/0056429 A1 | 3/2013 | Schomburg | |
| 2013/0336804 A1 | 12/2013 | Robinson et al. | |
| 2013/0343906 A1 * | 12/2013 | Funke | F02N 11/0862 417/10 |
| 2014/0077000 A1 * | 3/2014 | Cooper | B05B 7/2489 239/302 |
| 2015/0050012 A1 * | 2/2015 | Chang | F24H 9/2028 222/146.2 |
| 2016/0228901 A1 * | 8/2016 | Hooper | B05B 12/004 |
| 2016/0258318 A1 * | 9/2016 | McCormick | F01D 25/002 |

FOREIGN PATENT DOCUMENTS

| | | | | |
|---|---|---|---|---|
| FR | 2466002 A1 * | 3/1981 | ............ | G01F 23/38 |
| FR | 2757308 A1 * | 6/1998 | .......... | H01H 35/405 |
| GB | 2292836 A | 3/1996 | | |
| JP | S57113297 A | 7/1982 | | |
| JP | S5920859 U | 2/1984 | | |
| JP | 01248024 A * | 10/1989 | | |
| JP | H01248024 A | 10/1989 | | |
| JP | H07140162 A | 6/1995 | | |

OTHER PUBLICATIONS

International Search Report and Written Opinion for PCT Application No. PCT/US2017/058574 dated Feb. 13, 2018, 13 pgs.
Chinese Office Action for CN Application No. 201780063948.3 dated May 26, 2020, 6 pg.
Japanese Office Action for JP Application No. 2019-522509 dated Jun. 30, 2020, 2 pg.
EP Examination Report for EP Application No. 17795172.0 dated Jun. 3, 2020, 5 pgs.
Chinese Office Action for CN Application No. 201780063948.3 dated Feb. 22, 2021, 3 pgs.
Japanese Office Action for JP Application No. 2019-522509 dated Mar. 30, 2021, 1 pg.
European Examination Report for EP Application No. 17795172.0 dated Mar. 5, 2021, 5 pgs.
European Examination Report for EP Application No. 17795172.0, dated Mar. 1, 2022, 5 pgs.
European Notice of Allowance for EP Application No. 17795172.0, dated Mar. 2, 2023, 30 pgs.

\* cited by examiner

SYSTEMS AND METHODS FOR A MATERIAL SENSOR FOR A MATERIAL PUMP

CROSS-REFERENCE TO RELATED APPLICATION

This application claims priority to and the benefit of U.S. Provisional Application No. 62/413,403 entitled "SYSTEMS AND METHODS FOR A MATERIAL SENSOR FOR A MATERIAL PUMP," filed on Oct. 26, 2016, which is herein incorporated by reference in its entirety.

BACKGROUND

The subject matter disclosed herein relates to sprayers, and more particularly, to a material sensor for detecting an interruption of a flow of material within a material supply system.

Sprayers, such as spray guns, are used to apply a spray coating to a wide variety of target objects. Such sprayers are typically coupled to a material source, an air source, or other gas source. In some situations, a material supply system having one or more components may be utilized to route the material from a material source to each of one or more spray guns. For example, the material supply system may include one or more pumps or tanks that may be utilized to direct the material from the material source to the spray gun. In some situations, a flow of the material through the material supply system (e.g., through the one or more pumps and/or tanks) may be interrupted. For example, the source of the material may be empty or may need to be refilled with a fresh supply of the material (e.g., out-of-material condition). In such situations, it may be beneficial to stop operation of the pump or tank within the material supply system, in order to help reduce damage caused by operating a pump or tank without a material. Accordingly, it may be beneficial to provide for systems and methods that automatically stop operation of a pump and/or tank within a material supply system in an out-of-material condition.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system is provided. The system includes a material sensor system having an inlet and an outlet. The inlet receives a flow of a material and the outlet outputs the flow of the material. The material sensor system includes an inner cavity having a bottom surface, where the inner cavity receives the flow of the material. The material sensor system also includes a float system having one or more floats, where the one or more floats are floating within the material of the inner cavity. The material sensor system also includes a switch that sends one or more signals to a control valve system when the float system sinks to the bottom surface of the inner cavity.

In a second embodiment, a system is provided. The system includes a material sensor system having an inlet and an outlet. The inlet receives a flow of a material and the outlet outputs the flow of the material to a material pump. The material sensor system includes an inner cavity having a bottom surface, where the inner cavity receives the flow of the material. The material sensor system also includes a float system having one or more floats, where the one or more floats are float within the material of the inner cavity. The material sensor system also includes a switch that sends one or more signals when the float system sinks to the bottom surface of the inner cavity. The system also includes a control valve system configured to receive the one or more signals from the switch of the material sensor system.

In a third embodiment, a system is provided. The system includes one or more material sensor systems. Each material sensor system receives a flow of a material from a material supply. Each material sensor system includes an inner cavity having a bottom surface, where the inner cavity is configured to receive the flow of the material. Each material sensor system includes a float system with one or more floats, and the one or more floats are configured to float within the material of the inner cavity. Each material sensor system includes a switch configured to send one or more signals to a control valve system when the float system sinks to the bottom surface of the inner cavity. The system includes one or more material pumps, wherein each material pump receives the flow of material from an associated material sensor system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
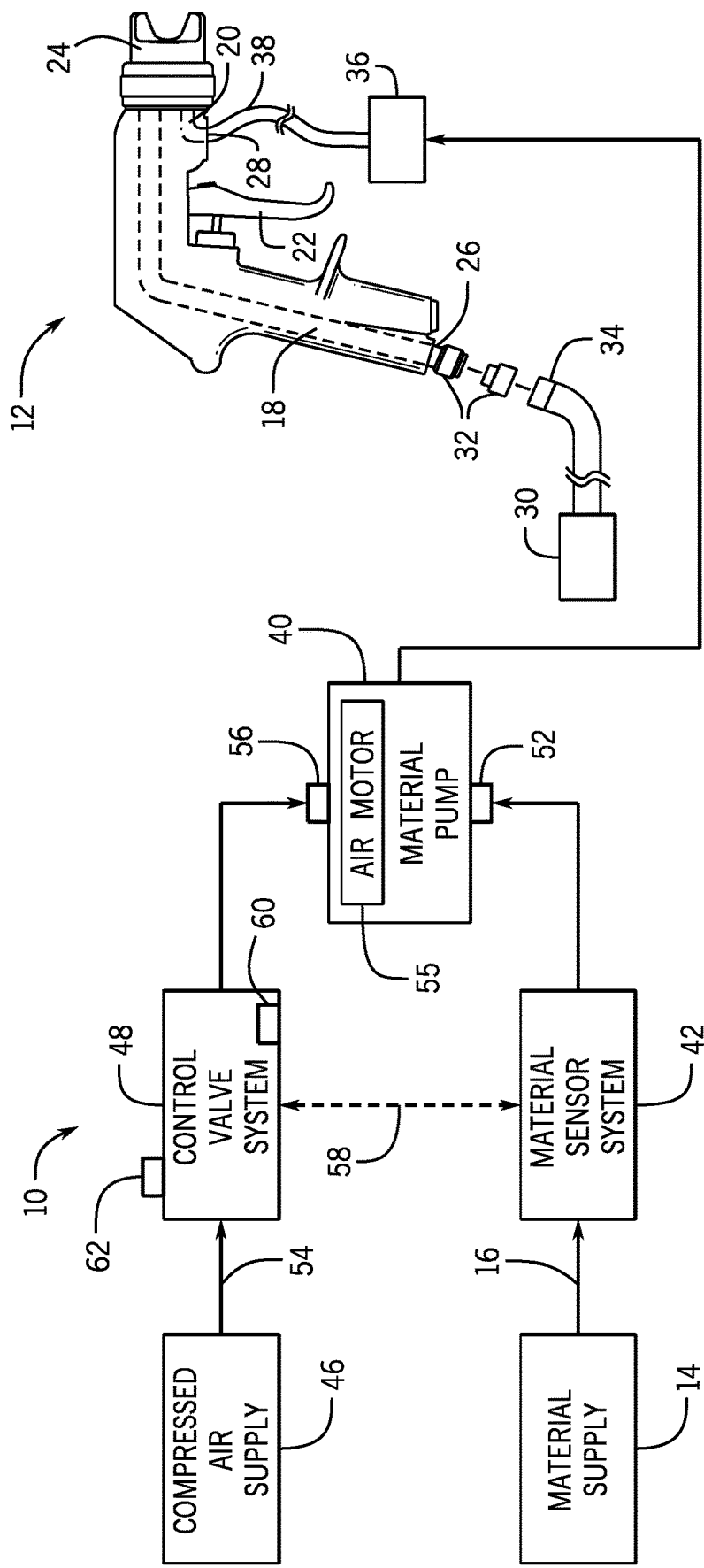
FIG. 1 is a schematic block diagram of an embodiment of a material supply system coupled to a sprayer.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed to a material sensor system configured to detect an interruption of a flow of material within a material supply system. Specifically, the material supply system may be configured to direct a material (e.g., paint, ink, varnish, water, catalyst, resin, etc.) from a material source (e.g., a material supply) to a spray gun (e.g., sprayer). For example, the material supply system may include various pumps (e.g., electric pumps, hydraulic pumps, pneumatic pumps, diaphragm pumps, piston pumps, reciprocating pumps, positive displacement pumps, rotodynamic pumps, etc.) and/or tanks (e.g., pressure tank, pressure pots, etc.) configured to route the material from the material source to the sprayer. In particular, the material sensor system may be configured to detect when the flow of the material through the material supply system (e.g., via the pump and/or tank) is interrupted, as further described in detail below. Furthermore, the material sensor system may be configured to automatically shut down operation of the material supply system (e.g., the pump and/or tank) when the flow of the material through the material supply system is interrupted, as further described in detail below.

The sprayer may be a handheld manual spray gun, an automated spray unit (e.g., a robotic mounted spray unit), a spray booth mounted spray unit, or any other suitable spray device. The sprayer also may include a pneumatic driven spray device, which uses a gas (e.g., air) to help atomize a liquid, shape a spray of the liquid, operate a valve of the sprayer, or a combination thereof. The sprayer may include a rotary bell cup, which rotates a bell cup to help create a spray. The sprayer may include an electrostatic spray device, which generates an electric field to help attract a spray onto a target object. Furthermore, the sprayer may be a spray coating device configured to produce a spray of a coating material, such as paint, for creating a coating on a surface of an object. In particular, the sprayer may receive a supply of the material from a material supply system, as further described in detail below.

In certain situations, the flow of the material from the material source (e.g., a container of the material, a supply of the material, etc.) to the sprayer may be interrupted. For example, the flow of the material may be interrupted when the supply of the material is empty, such as when the material container needs to be refilled and/or replaced. As a further example, a material leak within the system may interrupt the flow of the material from the material source to the sprayer. In these and other situations where the material cannot reach the pump and/or tank, air enters the material supply system. However, routing air through a pump may cause the pump to operate at high cycle rates (e.g., run-away condition), thereby potentially causing damage to various components of the pump. For example, a pump operating at a run-away condition may generate excess heat and/or may cause various components to fail. Furthermore, routing air through a pressure tank may harm downstream components configured to utilize the material. For example, in certain embodiments, a pressure tank may route two materials (e.g., resin and catalyst) to a two-component mixing system configured to receive each of the two materials at a predetermined flow rate. In particular, the two-component mixing system may be configured to mix the materials with a particular ratio of the first material to the second material. Accordingly, when a material cannot reach the tank, air may be routed into the two-component mixing system, causing the two-component mixing system to produce an off-ratio mixture of the two materials. Accordingly, it may be beneficial to utilize a material sensor system that detects when the flow of the material through the material supply system is interrupted (e.g., out-of-material condition), as further described in detail below. Furthermore, it may be beneficial to utilize a material sensor system to automatically shut down operation of the material supply system (e.g., the pump and/or tank) when the flow of the material through the material supply system is interrupted, as further described in detail below.

FIG. 1 is a schematic block diagram of an embodiment of a material supply system 10 coupled to a sprayer 12. The sprayer 12 may be configured to utilize a supply of material 14 to spray a coating of a material 16, such as paint, water, ink, varnish, catalyst, resin, etc. The sprayer 12 may be any spray-coating device (e.g., gravity-feed, siphon, high-volume low-pressure, or pressure) suitable for spraying coatings. The sprayer 12 includes a variety of passages, such as an air passage 18 and a fluid passage 20. In operation, a trigger 22 or other suitable control may send air and fluid through the air passage 18 and fluid passage 20 of the sprayer 12 enabling release of an air-fluid mixture through the nozzle 24.

The sprayer 12 may include an air inlet 26 and a fluid inlet 28 to receive air and fluids into the air passage 18 and the fluid passage 20 of the sprayer 12. The air inlet (i.e. port) 26 and the fluid inlet (i.e. port) 28 may be coupled to one or more spray components, such as an air source 30 and a fluid source 36 (e.g., a fluid conduit and/or siphon feed container). For example, in certain embodiments, the air inlet 26 may couple to an air source 30, which may be an air compressor or an air reservoir (e.g., air tank). The air inlet 26 may couple to the air source 30 using a variety of connections. For instance, the air inlet 26 may include a connector 32 (e.g., male) and the air source 30 may include corresponding connector 34 (e.g., female). In some embodiments, the air inlet 26 may be a female connector 32 and the air source 30 may be a male connector 34.

Similarly, the fluid inlet (i.e., port) 28 may couple to the fluid supply system 36, which may include a fluid source (e.g., paint mixer), a fluid conduit (e.g., hose) 38, a fluid reservoir (e.g., a gravity feed fluid container, a siphon feed fluid container, a multi-fluid feed container, disposable cup, fluid container, pump, etc.), and/or another fluid supply system 36 using a variety of connections. In certain embodiments, the fluid supply 36 may be coupled to the material supply system 10, such that the material 16 utilized by the sprayer 12 is provided by the material supply system 10. In certain embodiments, the fluid supply system 36 may be interchangeable with the material supply system 10.

In certain embodiments, the material supply system 10 includes a material pump 40, a material sensor system 42, a compressed air supply 46, and a control valve system 48. In the illustrated embodiment, the material sensor system 42 is disposed outside of the material pump 40, along the flow path of the material 16 from the material supply 14 to the material pump 40. However, in certain embodiments, the material sensor system 42 may be disposed within the material pump 40. In particular, the material sensor system 42 may be oriented such that the material 16 flows through the material sensor system 42 prior to entering an inlet 52 of the material pump 40, as further described with respect to FIG. 2-5. Accordingly, the material sensor system 42 may be disposed along a flow path of the material 16 from the material supply 14 to the material pump 40.

In certain embodiments, a motor disposed within the material pump 40 may be driven by a fluid. For example, the motor may be an air motor 55, a hydraulic motor, or an electric motor disposed within the material pump 40. As a further example, the motor may be driven by a compressed gas 54, a high pressure oil, a nitrogen gas, or any other type of fluid. In certain embodiments, the fluid 54 may be supplied from a fluid supply, such as a compressed air supply 46. In particular, the control valve system 48 may be positioned such that the compressed air 54 driving the air motor 55 of the material pump 40 flows through the control valve system 48 prior to entering an air inlet 56 of the material pump 40. In certain embodiments, the control valve system 48 may include a position valve 60 (e.g., a five port-two position valve 60, a 5/2 valve 60) that may be actuated based on one or more air signals 58 from the material sensor system 42. In certain situations where the flow of the material 16 from the material supply 14 to the material pump 40 is interrupted, the material sensor system 42 may be configured to send the one or more air signals 58 to the control valve system 48. Further, the control valve system 48 may be configured to actuate the position valve 60 based on the received air signals 58, thereby terminating the flow of compressed air 54 into the material pump 40. Accordingly, the material sensor system 42 may work with the control valve system 48 to terminate a flow of the compressed air 54 driving the material pump 40, thereby shutting down operation of the material pump 40 when there is an interruption of the flow of the material 16 into the material pump 40.

In certain embodiments, the control valve system 48 may include an indicator 62 configured to provide an indication to an operator that the position valve 60 of the control valve system 48 has been actuated. For example, when the position valve 60 is actuated, the indicator 62 may be raised from a depressed position, thereby indicating to the operator that the material pump 40 is turned off due to an out-of-material condition. Furthermore, in certain embodiments, the indicator 62 may also be utilized as a reset switch. For example, an operator may return the indicator 62 to its normal or original operating position (e.g., depressed position) once the out-of-material condition is corrected. In this manner, the material sensor system 42 and the control valve system 48 may be configured to regulate the operating conditions of the material pump 40, as further described with respect to FIGS. 2-5.

Figure 2:
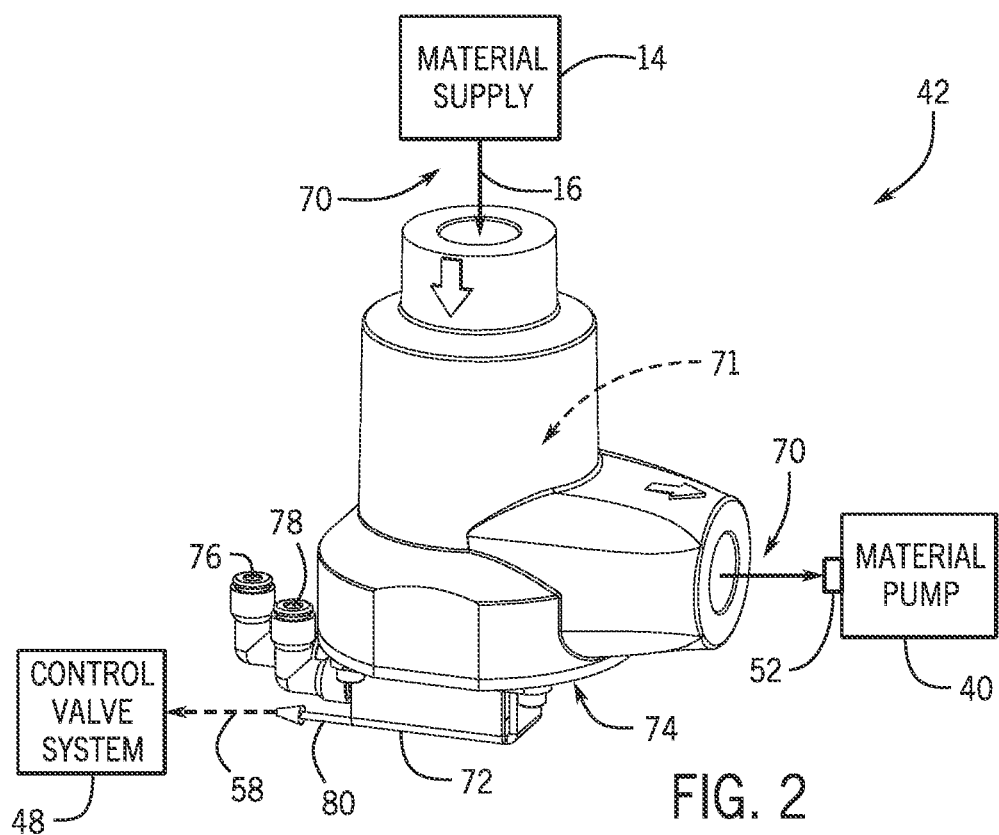
FIG. 2 is a perspective view of an embodiment of a material sensor system of the material supply system of FIG. 1.

FIG. 2 is a perspective view of an embodiment of the material sensor system 42 of the material supply system 10 of FIG. 1. In certain embodiments, the material sensor system 42 may be disposed along a flow path 70 of the material 16 from the material supply 14 to the material pump 40. In certain situations, the flow of the material 16 along the flow path 70 may be interrupted. For example, in certain situations, the material supply 14 may be an empty container or a tank of the material 16 (e.g., paint, water, ink, varnish, catalyst, resin, etc.) that needs to be refilled and/or replaced. As a further example, a material leak along the flow path 70 (e.g., a leak through one or more conduits or supply hoses) may interrupt the flow of the material 16. In these and other situations, the material sensor system 42 may be configured to detect an interruption of the flow of the material 16, as further described in detail below. Furthermore, as described above with respect to FIG. 1, the material sensor system 42 may be configured to automatically shut off the material pump 40 upon detecting an out-of-material condition.

Specifically, in certain embodiments, the material sensor system 42 may be disposed along the flow path 70 such that the material 16 flows through the material sensor system 42 prior to flowing through the inlet 52 of the material pump 40. As described with respect to FIG. 3, the material 16 enters and fills an inner cavity 71 of the material sensor system 42. When the inner cavity 71 of the material sensor system 42 is filled with the material 16, the material pump 40 operates normally and an out-of-material condition is not detected. In certain situations, the material sensor system 42 detects an out-of-material condition when the flow of the material 16 along the flow path 70 is interrupted. Specifically, the material sensor system 42 may be configured to detect an out-of-material condition when the flow of the material 16 through the inner cavity 71 is interrupted, as further described with respect to FIG. 3.

In certain embodiments, the material sensor system 42 includes a switch 72 coupled to a bottom surface 74 of the material sensor system 42. In various embodiments, the switch 72 may be a pneumatic switch, an electrical switch, a magnetic switch, a mechanical switch, or a combination thereof. In the illustrated embodiment, the switch 72 is a pneumatic switch 72 having an air inlet 76, an air exhaust 78, and a signal outlet 80. In particular, the signal outlet 80 may be configured to provide the one or more air signals 58 to the control valve system 48 when an out-of-material condition is detected. For example, in situations where the material supply 14 is empty and there is not a continuous flow of the material 16 along the flow path 70, the material sensor system 42 may be configured to send the one or more air signals 58 to the control valve system 48. As noted above, the control valve system 48 may shut off a supply of the compressed air 54 utilized to drive the material pump 40 upon receiving the air signals 58. Accordingly, the control valve system 48 may be configured to shut off operation of the material pump 40 based on feedback from the material sensor system 42, as further described with respect to FIG. 3.

Figure 3:
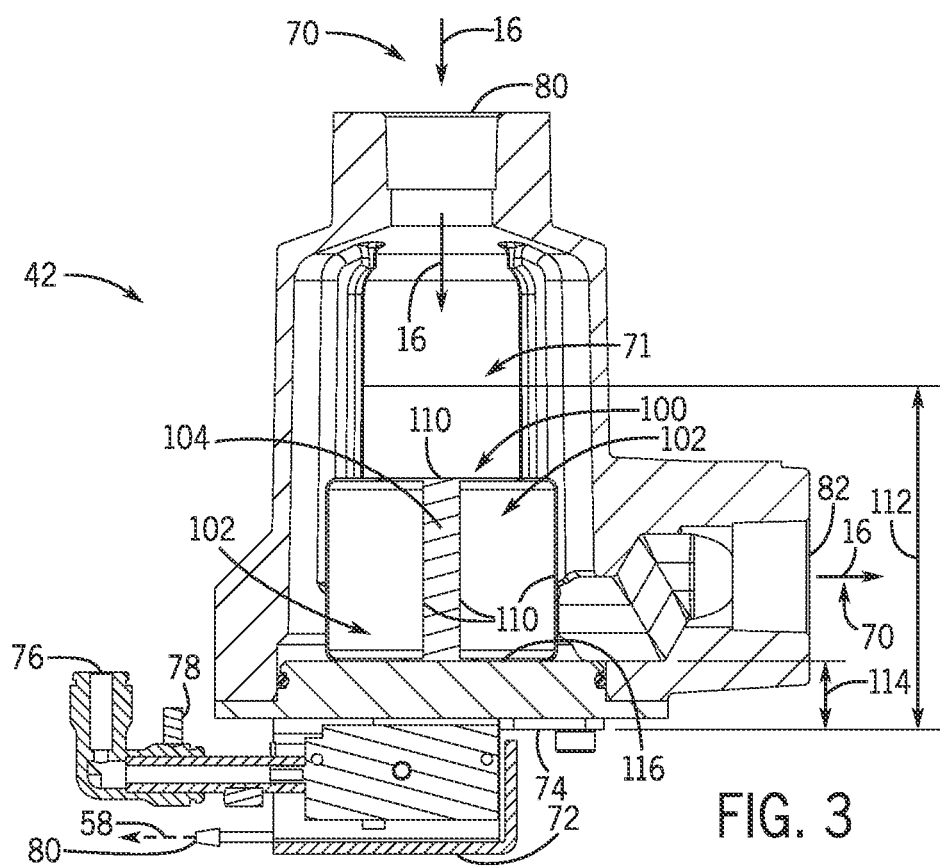
FIG. 3 is a cross-sectional side view of an embodiment of the material sensor system of FIG. 2.

FIG. 3 is a cross-sectional side view of an embodiment of the material sensor system 42 of FIG. 2. As noted above, in certain embodiments, the material sensor system 42 may be disposed along a flow path 70 of the material 16 from the material supply 14 to the material pump 40. Accordingly, the material 16 may enter the material sensor system 42 through a material inlet 81, and may fill the inner chamber 71 with the material 16. Furthermore, the material 16 may exit the material sensor system 42 through the material outlet 82, and may be routed via the material outlet 82 to the inlet 52 of the material pump 40. In certain embodiments, the material sensor system 42 may include a float system 100 having one or more floats 102 and a magnet 104. In the illustrated embodiment, the magnet 104 is disposed within a single float 102; however, it should be noted that in other embodiments, a plurality of floats 102 may be utilized. Further, as noted above, the material sensor system 42 may include the switch 72 coupled to a bottom surface 74 of the material sensor system 42. For example, the switch 72 may be a pneumatic switch configured to provide the one or more air signals 58 to the control valve system 48 when an out-of-material condition is detected. In particular, the pneumatic switch may be activated by the position of the magnet 104 within the inner cavity 71 of the material sensor system 42, as further described in detail below. In certain embodiments, the switch 72 may be coupled to a side surface 75 and/or a top surface 77 of the material sensor system 42. In these situations, the switch 72 may be activated by the corresponding position of the magnet 104 within the inner cavity 71, as further described in detail below.

In certain embodiments, the float system 100 may be disposed within the inner cavity 71 of the material sensor system 42. In certain embodiments, the float system 100 may include a single float or a plurality of floats (e.g., 2, 3, 4, 5, 6, 7, 8, 9, 10, or more). For example, in the illustrated embodiment, the float system 100 includes the float 102. The float 102 of the float system 100 may be a hollow chamber filled with air, or any other type of material that facilitates floating within the inner cavity 71. In certain embodiments, the float system 100 may include one or more thin walls 110 formed out of a stainless steel material. In other embodiments, any type of light material that enables the float system 100 to float within the inner cavity 71 may be utilized. Further, any type of material that is also chemically resistant to the material 16 may be utilized. In particular, the float 102 of the float system 100 may surround and/or otherwise support the magnet 104. In the illustrated embodiment, a single magnet 104 is disposed with the float 102. However, it should be noted that any number of magnets 104 (e.g., 2, 3, 4, 5, 6, or more) may be disposed within the float system 100. Furthermore, any number of floats (e.g., 2, 3, 4, 5, 6, 7, 8, 9, or 10) may be utilized to surround and/or support the one or more magnets 104 within the float system 100. In particular, the magnet 104 may be surrounded and sealed by the plurality of floats 102 and may be contained entirely within the float system 100. In certain embodiments, the float system 100 may include a single float 102 with a single magnet 104, and a plurality of such float systems 100 may be included within the system 10.

In certain embodiments, the float system 100 may be designed to have a specific gravity (e.g., low gravity) that enables the float system 100 to float within one or more different types of liquids and sink within one or more different types of gases. For example, the float system 100 may float within the material 16 (e.g., paint, ink, varnish, water, catalyst, resin, etc.) and may sink within air. Accordingly, when the inner chamber 71 is filled with the material 16, the float system 100 (including the magnet 104) rises and floats to the top surface of the inner cavity 71. In this manner, when the inner cavity 71 is filled with the material 16, the magnet 104 of the float system 100 may be positioned at a first distance 112 from the switch 72 (e.g., pneumatic switch). Likewise, when a quantity of the material 16 within the inner cavity 71 is low, the magnet 104 of the float system 100 may be positioned at a second distance 114 from the switch 72, such that the second distance 114 is less than the first distance 112. In other words, when the amount of material 16 within the inner cavity 71 is low, the magnet 104 of the float system 100 may sink to a bottom 116 of the inner cavity 71. The magnet 104 may be any magnetic material.

In particular, when the magnet 104 is within close proximity to the switch 72, the magnetic field generated by the magnet 104 may engage and open the switch 72. For example, when the magnet 104 is within a particular distance of the switch 72 (e.g., the second distance 114), the magnet 104 may be configured to generate a magnetic field that engages and/or opens the switch 72. As noted above, the switch 72 may be a pneumatic switch, and when engaged or opened, the pneumatic switch may be configured to provide the air signals 58 to the control valve system 48. Accordingly, an out-of-material condition may cause the magnet 104 of the float system 100 to generate a magnetic field that is detected by the switch 72, and the switch 72 may be configured to send one or more air signals 58 to the control valve system 48 based on the out-of-material condition. Furthermore, the control valve system 48 may shut off a supply of the compressed air 54 utilized to drive the material pump 40 upon receiving the air signals 58. In this manner, the switch 72 may be activated by the position of the magnet 104 within the inner cavity 71 of the material sensor system 42, and the position of the magnet 104 may be dependent on the flow of the material 16 along the flow path 70 (e.g., continuous, interrupted, etc.).

Figure 5:
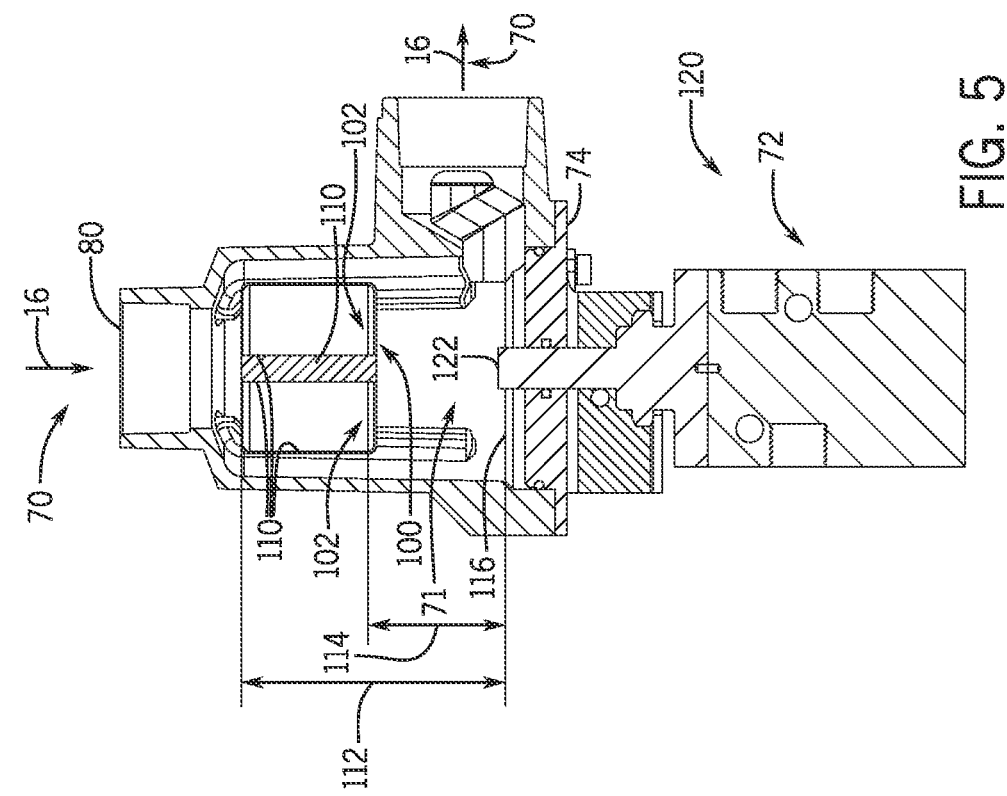
FIG. 5 is a cross-sectional view of an embodiment of the material sensor system of FIG. 4.
Figure 4:
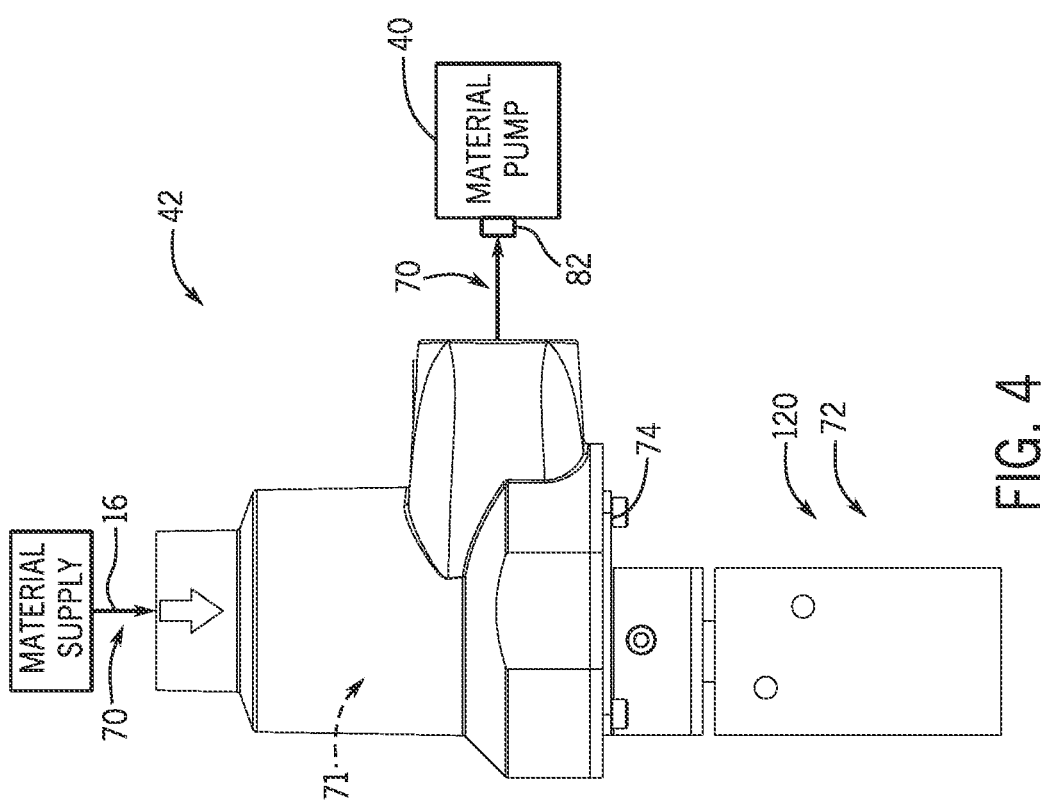
FIG. 4 is a perspective view of an embodiment of a material sensor system of the material supply system of FIG. 1, where the material sensor system is coupled to a switch system.

As noted above, in certain embodiments, the switch 72 may be coupled to the side surface 75 and/or the top surface 77 of the material sensor system 42. In these situations, the switch 72 may be activated by the corresponding position of the magnet 104 within the inner cavity 71. For example, in certain embodiments, the float may be configured in a reverse manner, such that an out-of-material condition causes the magnet 104 of the float system 100 to generate a magnetic field that is detected by the switch 72 disposed on the side surface 75 and/or the top surface 76. FIG. 4 is a perspective view of an embodiment of the material sensor system 42 of the material supply system of FIG. 1, where the material sensor system is coupled to a mechanical switch system 120. In particular, the mechanical switch system 120 of the material sensor system 42 may be engaged by a movement of the float system 100, as further described with respect to FIG. 5. FIG. 5 is a cross-sectional view of an embodiment of the material sensor system of FIG. 4. As noted above, in certain embodiments, the switch 72 may be a pneumatic switch, an electrical switch, a magnetic switch, a mechanical switch, or a combination thereof. In the illustrated embodiment, the switch 72 is a mechanical switch 120.

Specifically, in certain embodiments, the mechanical switch 120 may be engaged or activated by the movement of the float system 100 within the inner cavity 71. For example, as noted above, the float system 100 may rise and/or sink based on the quantity of the material 16 within the inner cavity 71. With a continuous flow of the material 16 along the flow path 70, the inner cavity 71 may be filled with the material 16, and the float system 100 may be positioned at the first distance 112 from the bottom 116 of the inner cavity 71. In certain situations, the flow of the material 16 along the flow path 70 may be interrupted, and the float system 100 may sink to the second distance 114 from the bottom 116 of the inner cavity 71. In particular, in certain embodiments, when the float system 100 sinks to the bottom 116 of the inner cavity 71, the float system 100 may be configured to physically engage a trigger 122 of the mechanical switch 120. For example, in certain embodiments, the trigger 122 may be depressed by the weight of the float system 100 as it sinks to the bottom 116. In particular, triggering the mechanical switch 120 may cause the mechanical switch 120 to send one or more signals 58 to the control valve system 48. Furthermore, the control valve system 48 may shut off a supply of the compressed air 54 utilized to drive the material pump 40 upon receiving the signals 58. In this manner, the mechanical switch 120 may be activated by the position of the float system 100 within the inner cavity 71 of the material sensor system 42, and the position of the float system 100 may be dependent on the flow of the material 16 along the flow path 70 (e.g., continuous, interrupted, etc.).

Figure 6:
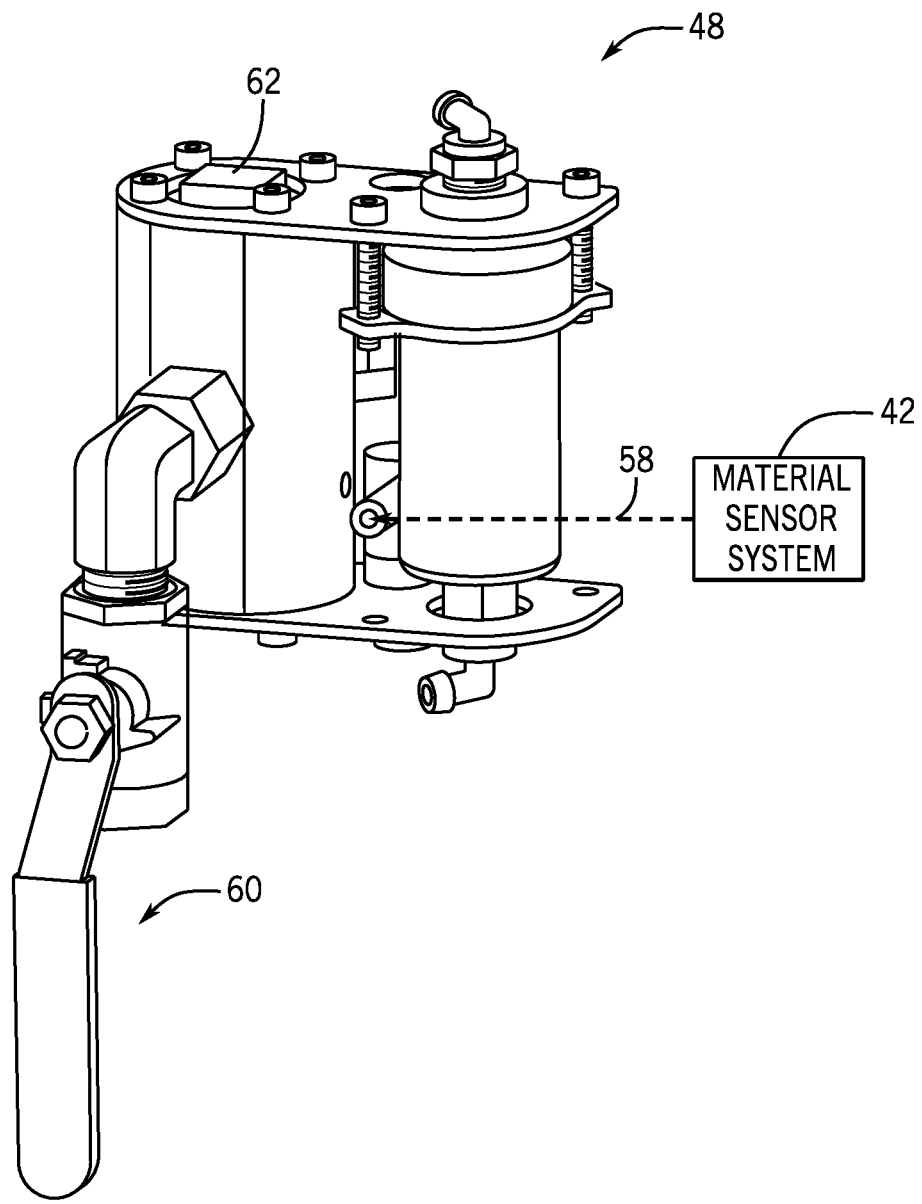
FIG. 6 is a perspective view of an embodiment of a control valve system of the material supply system of FIG. 1.

FIG. 6 is a perspective view of an embodiment of the control valve system 48 of the material supply system 10 of FIG. 1. As noted above, in certain embodiments, the control valve system 48 may be disposed along an air flow path between the compressed air supply 46 and the air motor 55 of the material pump 40. Specifically, the compressed air 54 driving the air motor 55 of the material pump 40 flows through the control valve system 48 prior to entering an air inlet 56 of the material pump 40.

In certain embodiments, the control valve system 48 may include the position valve 60 (e.g., a five port-two position valve 60, a 5/2 valve 60) that may be actuated based on the one or more air signals 58 received from the material sensor system 42. As noted above, the material sensor system 42 may be configured to send the one or more air signals 58 to the control valve system 48 in an out-of-material condition. Further, the control valve system 48 may be configured to actuate the position valve 60 based on the received air signals 58. For example, in certain embodiments, the position valve 60 may include a first position (e.g., actuated position) and a second position (e.g., original position). When the position valve 60 is actuated, the flow of the compressed air 54 through the control valve system 48 may be turned off, thereby terminating the flow of the compressed air 54 into the air motor 55 of the material pump 40. Accordingly, the control valve system 48 may be configured to terminate operation of the material pump 40 based on feedback signals from the material sensor system 42, which may indicate an interruption of the flow of the material 16 into the material pump 40.

In certain embodiments, the control valve system 48 may include an indicator 62 configured to provide an indication to an operator that the position valve 60 of the control valve system 48 has been actuated. Specifically, when the position valve 60 is actuated, the indicator 62 may be in a raised position, thereby indicating to the operator that the material pump 40 is turned off due to an out-of-material condition. Likewise, when the position valve 60 is not actuated, the indicator 62 may be in a depressed position, thereby indicating to the operator that the material pump 40 is operating normally (e.g., no out-of-material condition). In certain embodiments, the operator may utilize the indicator 62 to reset the material supply system 10. For example, after an out-of-material condition is corrected, the indicator 62 may be returned to the depressed position, and operation of the system 10 may resume.

Figure 7:
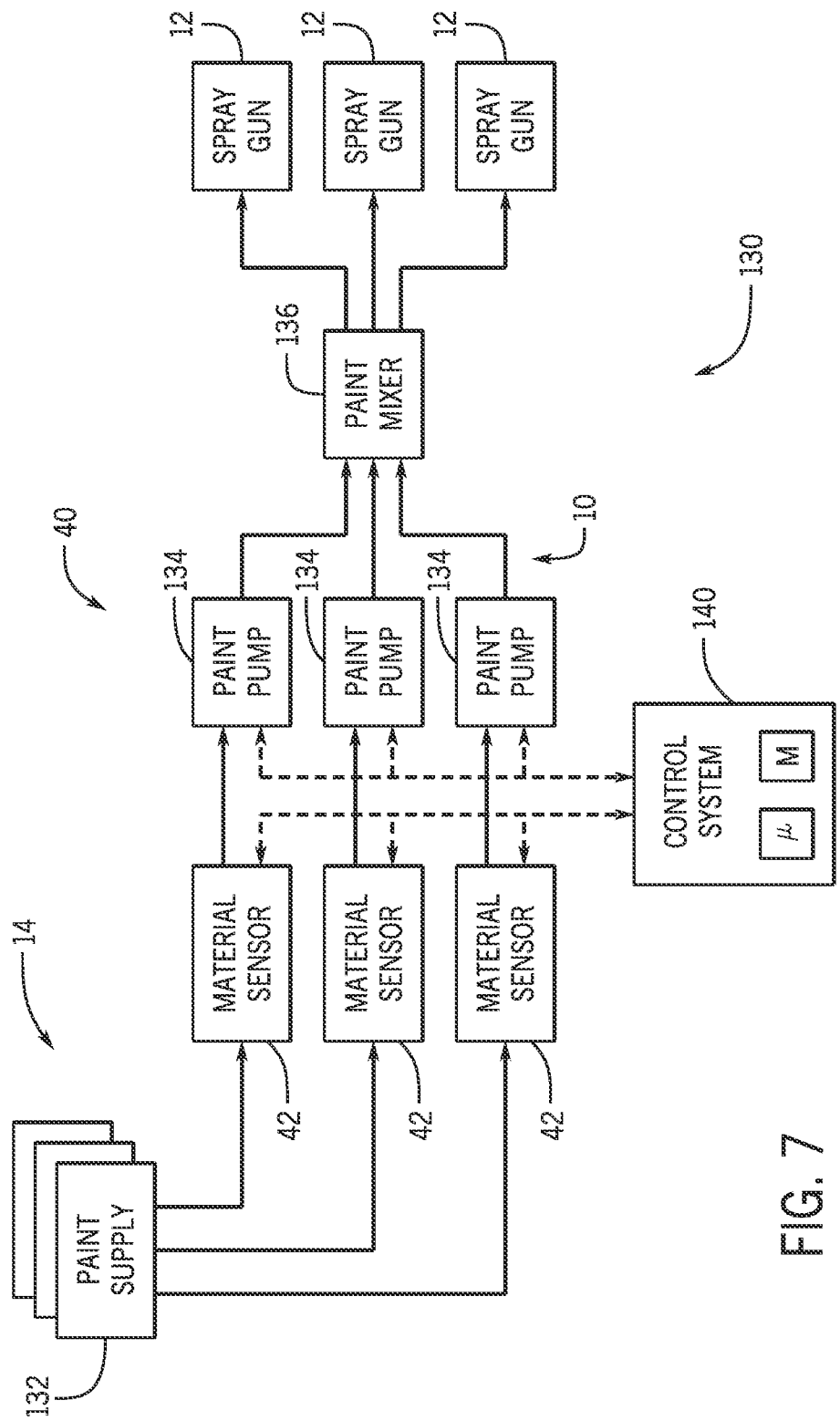
FIG. 7 is a schematic block diagram of the material supply system of FIG. 1, where the material supply system includes one or more material sensor systems coupled to a control system.

FIG. 7 is a schematic block diagram 130 of a plurality of material supply systems 10 of FIG. 1. In particular, in the illustrated embodiment, one or more material sensor systems 10 may be coupled to a control system 140. Specifically, each material supply system 10 may include one or more paint supplies 132 (e.g., material supply 14) configured to provide paint (e.g., the material 16) to one or more paint pumps 134 (e.g., material pumps 40). In the illustrated embodiment, each of the one or more paint pumps 134 may provide a supply and/or a type of paint into a paint mixer 136, which in turn may route the mixed paint to one or more sprayers 12. In certain situations, one or more of the paint pumps 134 may encounter an out-of-material condition, which may result in the paint mixer 136 mixing an incorrect mixture of paint. Indeed, it may be beneficial to utilize a material sensor 42 with each of the one or more paint pumps 134 to detect an out-of-material condition for a paint pump 134. Accordingly, as noted above, the control system 140 may be configured to shut down a particular component of the system (e.g., a single paint pump 134), the paint mixer 136, and/or the system as a whole based on feedback from one or more of the material sensors 42.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a material tank configured to supply a material;
 a material sensor system, comprising:
  an inlet configured to receive a continuous flow of the material from the material tank, wherein the material sensor system is external to the material tank, wherein, in operation, the material sensor system receives the continuous flow of the material from the material tank via the inlet;
  a bottom wall at least partially enclosing an inner cavity configured to receive the continuous flow of the material from the inlet, wherein the bottom wall comprises a first surface configured to contact the material and a second surface opposite the first surface;
  an outlet configured to output the continuous flow of the material from the inner cavity;
  a float system comprising a float, wherein the float is configured to float in the continuous flow of the material passing through the inner cavity, and wherein the float is aligned with the inlet and is configured to move in a first direction along a flow direction of the continuous flow of the material through the inlet and into the inner cavity and to move in a second direction opposite to the first direction; and
  a switch coupled to the second surface of the bottom wall and disposed external to the inner cavity, wherein the float system is configured to engage the first surface of the bottom wall in response to an interruption in the continuous flow of the material through the inner cavity, and wherein the switch is configured to send one or more signals to a control valve system when the float system engages the first surface of the bottom wall;
 a spray gun comprising a main body having an additional inlet configured to receive the continuous flow of the material into the main body of the spray gun; and
 a material pump fluidly coupled between the outlet and the additional inlet and configured to receive the continuous flow of the material from the outlet, wherein the material pump is configured to direct the continuous flow of the material to the additional inlet of the spray gun to enable the continuous flow of the material from the material tank to the additional inlet until occurrence of the interruption in the continuous flow of the material through the inner cavity.

2. The system of claim 1, wherein the float system comprises a magnet disposed within the float.

3. The system of claim 2, wherein the switch is configured to send the one or more signals when the magnet of the float system is within a threshold distance of the first surface within which a magnetic field of the magnet triggers the switch.

4. The system of claim 1, wherein the switch is a mechanical switch, an electrical switch, or a pneumatic switch.

5. The system of claim 1, wherein the one or more signals comprise one or more air signals, wherein the switch is configured to send the one or more air signals to the control valve system when the float system contacts the first surface of the bottom wall, and wherein the control valve system is configured to terminate operation of the material pump upon receiving the one or more air signals.

6. The system of claim 1, wherein the switch is a pneumatic switch.

7. The system of claim 1, wherein the interruption in the continuous flow of the material corresponds to an out-of-material condition in the material tank.

8. The system of claim 7, wherein the control valve system is configured to send the one or more signals to terminate operation of the material pump based on the float system engaging the first surface of the bottom wall in response to the interruption in the continuous flow of the material.

9. The system of claim 1, comprising:
a housing of the material sensor system, wherein the housing comprises the inlet and the outlet, the housing defines the inner cavity, and the outlet is configured discharge the continuous flow of the material in a third direction crosswise to the first direction, and
wherein the material tank is separate from the housing.

10. The system of claim 1, wherein the material sensor system comprises a passage extending from the inner cavity to the outlet and configured to direct the continuous flow of the material from the inner cavity to the outlet, wherein the float is disposed adjacent the passage while the float system engages the first surface of the bottom wall.

11. The system of claim 1, wherein the float comprises a first float surface configured to engage the first surface of the bottom wall and a second float surface opposite to the first float surface, wherein the inlet is configured to direct the continuous flow of the material onto the second float surface of the float.

12. The system of claim 11, wherein the first float surface is a first planar surface, the second float surface is a second planar surface, and the float comprises a side surface extending from the first planar surface to the second planar surface.

13. The system of claim 1, comprising a material mixer fluidly coupled between the material pump and the additional inlet of the spray gun.

14. A system, comprising:
a material tank configured to supply a material;
a material sensor system, comprising:
an inlet configured to receive a continuous flow of the material from the material tank, wherein the material sensor system is external to the material tank, wherein, in operation, the material sensor system receives the continuous flow of the material from the material tank via the inlet;
a bottom wall at least partially enclosing an inner cavity configured to receive the continuous flow of the material from the inlet, wherein the bottom wall comprises a first surface configured to contact the material and a second surface opposite the first surface;
an outlet configured to output the continuous flow of the material from the inner cavity;
a float system comprising a float, wherein the float is configured to float in the continuous flow of the material passing through the inner cavity, and wherein the float is aligned with the inlet and is configured to move in a first direction along a flow direction of the continuous flow of the material through the inlet and into the inner cavity and to move in a second direction opposite to the first direction; and
a switch coupled to the second surface of the bottom wall and disposed external to the inner cavity, wherein the float system is configured to engage the first surface of the bottom wall in response to an interruption in the continuous flow of the material through the inner cavity, and wherein the switch is configured to send one or more signals when the float system engages the first surface of the bottom wall;
a control valve system configured to receive the one or more signals from the switch;
a spray gun comprising a main body having an additional inlet configured to receive the continuous flow of the material and direct the continuous flow of the material into a fluid passage in the main body of the spray gun; and
a material pump fluidly coupled between the outlet and the additional inlet and configured to receive the continuous flow of the material from the outlet, wherein the material pump is configured to direct the continuous flow of the material to the additional inlet of the spray gun to enable the continuous flow of the material from the material tank to the additional inlet until occurrence of the interruption in the continuous flow of the material through the inner cavity.

15. The system of claim 14, wherein the control valve system is configured to direct a flow of compressed air to an air motor configured to drive operation of the material pump and to terminate the flow of the compressed air to the air motor based on the one or more signals.

16. The system of claim 14, wherein the float system comprises a magnet disposed within the float, and wherein the switch is configured to send the one or more signals to the control valve system when the magnet of the float system is within a threshold distance of the first surface within which a magnetic field of the magnet triggers the switch.

17. A system, comprising:
one or more material tanks, wherein each of the one or more material tanks is configured to supply a respective material;
one or more material sensor systems, wherein each of the one or more material sensor systems is configured to receive a continuous flow of the respective material from a respective material tank of the one or more material tanks, wherein the one or more material sensor systems are external to the one or more material tanks, wherein, in operation, each of the one or more material sensor systems receives the continuous flow of the respective material from the respective material tank, and wherein each of the one or more material sensor systems comprises:
an inner cavity comprising a surface, wherein the inner cavity is configured to receive the continuous flow of the respective material from the respective material tank via an inlet of the material sensor system;
a float system comprising one or more floats, wherein the one or more floats are configured to float in the continuous flow of the respective material passing through the inner cavity, and wherein the one or more floats are aligned with the inlet and are configured to move in a first direction along a flow direction of the continuous flow of the respective material through the inlet and into the inner cavity and to move in a second direction opposite to the first direction; and a switch disposed adjacent to the surface and external to the inner cavity, wherein the float system is configured to engage the surface in response to an interruption in the continuous flow of the respective material through the inner cavity, and wherein the switch is configured to send one or more signals to a control valve system when the float system engages the surface of the inner cavity;

a spray gun comprising a main body having an additional inlet configured to receive the continuous flow of the respective material from each of the one or more material sensor systems and direct the continuous flow of the respective material into a fluid passage in the main body of the spray gun; and one or more material pumps, wherein each of the one or more material pumps is fluidly coupled between an outlet of a corresponding material sensor system of the one or more material sensor systems and the additional inlet of the spray gun and is configured to receive the continuous flow of the respective material from the outlet of the corresponding material sensor system, and wherein each of the one or more material pumps is configured to direct the continuous flow of the respective material from the corresponding material sensor system to the additional inlet to enable the continuous flow of the respective material from the respective material tank to the additional inlet.

18. The system of claim 17, comprising the control valve system, wherein the control valve system is associated with a material pump of the one or more material pumps and configured to route a flow of compressed air to an air motor of the material pump to adjust operation of the air motor.

19. The system of claim 18, wherein the control valve system is configured to terminate the flow of the compressed air to the air motor of the material pump based on the one or more signals.

20. The system of claim 17, wherein each of the one or more material pumps is configured to route the continuous flow of the respective material into a paint mixer fluidly coupled between the one or more material pumps and the spray gun.

\* \* \* \* \*